(12) United States Patent
Zhuang et al.

(10) Patent No.: US 12,347,220 B2
(45) Date of Patent: Jul. 1, 2025

(54) HANDWRITING TEXT RECOGNITION SYSTEM BASED ON NEURAL NETWORK

(71) Applicants: Jianming Zhuang, Shenzhen (CN); Chung Kwong Chan, Shenzhen (CN)

(72) Inventors: Jianming Zhuang, Shenzhen (CN); Chung Kwong Chan, Shenzhen (CN)

(73) Assignee: SUNIAPTE. LTD, Singapore (SG)

( * ) Notice: Subject to any disclaimer, the term of this patent is extended or adjusted under 35 U.S.C. 154(b) by 394 days.

(21) Appl. No.: 17/931,906

(22) Filed: Sep. 14, 2022

(65) Prior Publication Data

US 2024/0087349 A1   Mar. 14, 2024

(51) Int. Cl.
*G06V 30/00* (2022.01)
*G06V 10/82* (2022.01)
*G06V 30/226* (2022.01)

(52) U.S. Cl.
CPC .......... *G06V 30/2268* (2022.01); *G06V 10/82* (2022.01)

(58) Field of Classification Search
CPC .... G06V 30/2268; G06V 10/82; G06V 30/36; G06V 30/226; G06V 30/1823; G06V 30/19147; G06V 30/19193; G06N 3/0455; G06N 3/08; G06N 20/00; G06N 3/02
See application file for complete search history.

(56) References Cited

U.S. PATENT DOCUMENTS

2023/0245483 A1 * 8/2023 Zhang ................ G06V 30/1831
382/157

FOREIGN PATENT DOCUMENTS

WO   WO-2021238446 A1 * 12/2021 ......... G06K 9/00402

OTHER PUBLICATIONS

Eisa et al, Online Handwriting Recognition Using Encoder-Decoder Model, ICCCEEE (Year: 2019).*
Kass et al, AttentionHTR: Handwritten Text Recognition Based on Attention Encoder-Decoder Network, arXiv 2201.09390v3 (Year: 2022).*

* cited by examiner

*Primary Examiner* — Xiao Liu

(57) ABSTRACT

A handwriting text recognition system based on neural network includes a stroke input processor for receiving tracks of online handwriting texts, a string database for storing a large amount of the tracks; a word recognition neural network; and an after-processor being connected to the string database and the output interface of the text recognition neural network; The handwriting text recognition system based on neural network provides higher rates of confidences. Some natural languages frequently used all over the world can be recognized with a higher accuracy (including languages written from right to left and from left to right). The association relations between the input strokes and the character strings can be provided. It could support any strokes with irregular written orders.

13 Claims, 3 Drawing Sheets

HANDWRITING TEXT RECOGNITION SYSTEM BASED ON NEURAL NETWORK

FIELD OF THE INVENTION

The present invention is related to text recognition by neural networks, and in particular to a handwriting text recognition system based on neural network.

BACKGROUND OF THE INVENTION

On line handwriting text recognition technology is a technology which converts strokes of handwriting texts into character strings. As comparing with the recognition of printing texts, handwriting texts are necessary to consider writing habits of the writers, and thus it is more difficult. While as comparing with off line handwriting text recognition, the online handwriting text recognition has the advantage of having messages of time sequence of strokes and less background noises and thus it has higher accuracy.

There are two ways about the recognition of handwriting text recognition. A first one is based on separation and decoding, at first, the strokes are separated by writing order, and then a dynamic classifier is used to decide an optimum stroke separation method and a corresponding recognition result. This method is used in MyScript and Google. Advantage of this method is that it can output accurate association of the strokes and the character corresponding to the strokes. In the second method, it is based on a two direction circulation neural network and connectionist temporal classification (CTC). This method is adapted by Samsung and Google. Advantage of this method is that it can be executed easily, because an end to end training can be used in training of models.

However, in the above mentioned prior art, the recognition ratios are low and many worldwide used natural languages cannot be accurate recognized (including the languages which are written from right to left), and it cannot recognized the texts written in irregular order.

Therefore, the present invention desires to provide a novel invention which can accurately recognize handwritten texts based on neural networks.

SUMMARY OF THE INVENTION

Accordingly, the object of the present invention is to provide a handwriting text recognition system based on neural network, wherein the present invention provides higher rates of confidences. The natural languages frequently used all over the world can be recognized with a higher accuracy (including languages written from right to left and from left to right). The association relations between the input strokes and the character strings can be provided in the present invention. the present invention could support any strokes with irregular written orders. In real use, the present invention can be equipped with text recognition range for supporting open or closed corpus application. The present invention could be also used in the hand writing text recognition of mobile phones or tablet computers.

To achieves above object, the present invention provides a handwriting text recognition system based on neural network, comprising: a stroke input processor for receiving tracks of online handwriting texts, where the handwriting texts exist corresponding to character strings; the tracks being divided into several strokes; in a training stage and a prediction stage of a neural network, the stroke input processor pre-processing the strokes; in training stage, these strokes being corresponding to a character strings which is a known character string; ach character string being formed by at least one character; the handwriting track and corresponding character string being formed as a character string sample; a string database connected to the stroke input processor for storing a large amount of the tracks; in training stage, the string database serving for storing the tracks and corresponding character strings which are formed as character string samples; a word recognition neural network including an encoder, a decoder, an input interface in the encoder, and an output interface in the decoder; the input interface being connected to the string database for receiving the strokes of tracks; the encoder serving for finding a context matrix from the strokes and an initial state used by the decoder; the decoder receiving the context matrix and the initial states; furthermore the output interface serving for outputting parts of the predicted character strings and confidences of these parts, in that, in the output of the decoder, the predicted character string being outputted part by part, that is to say, in each operation of the decoder, only a part of the predicted character string and it confidence are outputted, and then this part and the confidence are transferred back to the input of the decoder to generate a further part of the character string and confidence thereof; this further part includes the former part of the character string inputted to the decoders; these processes are performed again until a set condition is achieved; wherein in the training stage, each stroke of the track is inputted to the text recognition neural network from the input interface, and the character strings corresponding to the track are used as predicted output of the text recognition neural network; and an after-processor being connected to the string database and the output interface of the text recognition neural network; the character strings in the candidate unit are normalized in the after processor to be utilized as outputs of the text recognition neural network.

DETAILED DESCRIPTION OF THE INVENTION

Figure 1:
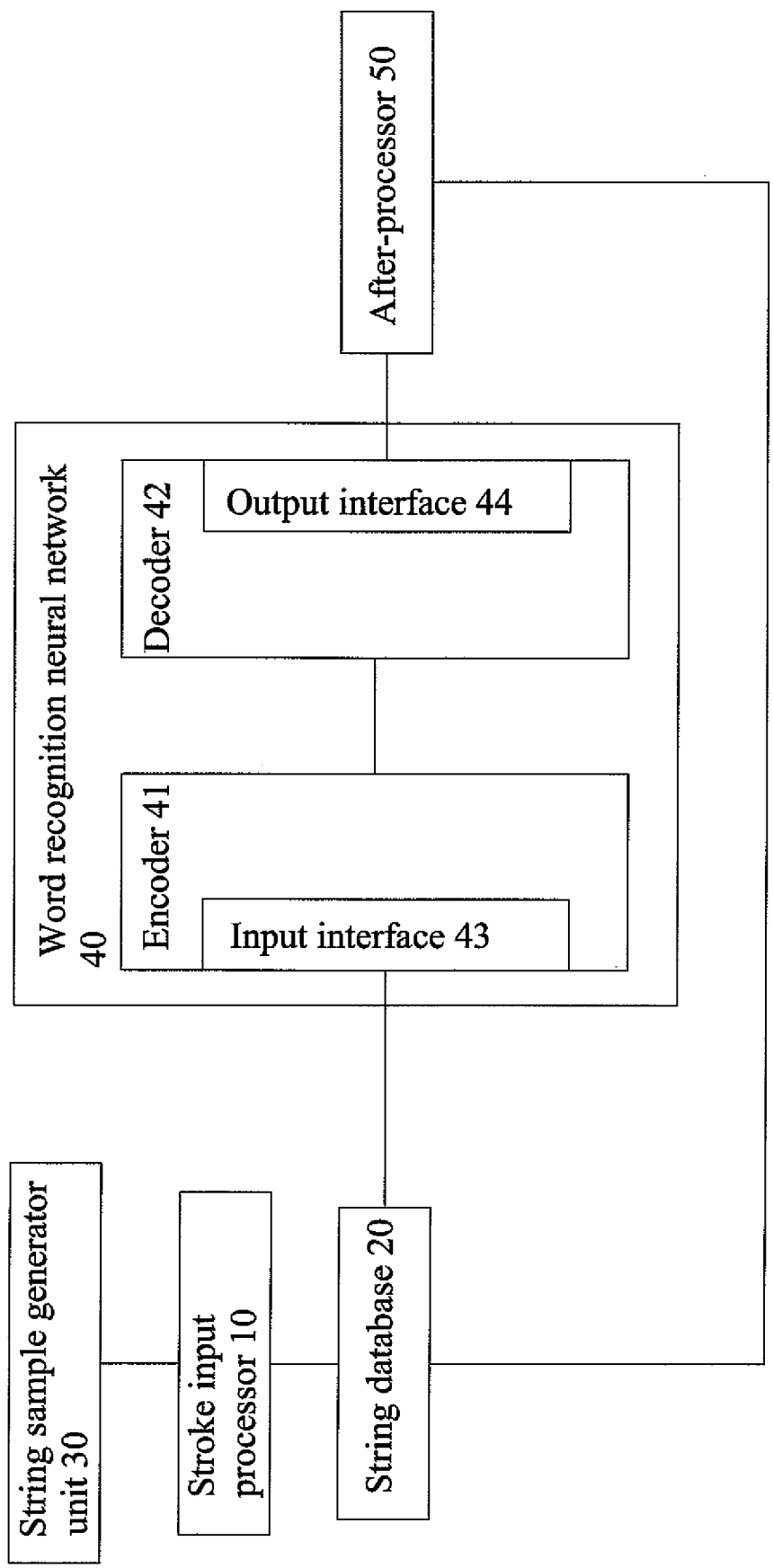
FIG. 1 is a schematic view showing the structure of the elements of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 4, the structure of the present invention is illustrated. In the present invention, a sequence sampling points (including x coordinates, y coordinates, and stroke end tokens) expressing strokes of handwriting texts, while outputs are a series of character strings corresponding to the strokes. The lengths of the input strokes and the character strings are not fixed. In the present invention, an attention based encoder and decoder structure is adapted in the present invention.

The present invention includes the following elements.

A stroke input processor 10 serves for receiving tracks 80 of online handwriting texts, where the handwriting texts exist corresponding to character strings. In that the tracks 80 are divided into several strokes 81. In a training stage and a prediction stage of a neural network, the stroke input processor 10 pre-processes the strokes 81. In training stage, these strokes 81 are corresponding to a known character strings 90. Each character string 90 is formed by at least one character 91. The handwriting track 80 and corresponding character string 90 are formed as a character string sample 100 (referring to FIG. 3).

The pre-processing of the stroke input processor 10 includes the following ways.

Determining sequences of the strokes: Determining an outer rectangular frame of each stroke 81 which is a minimum rectangular frame for containing the stroke 81. Base of the left side of the frame of each stroke 81, a sequence for frames of all strokes 81 is determined according to the left side of the frames of the strokes 81.

Estimating of line height: When a length of a stroke 81 is approximately equally to a width of a frame containing the stroke 81, a width of the frame is used as a size of the stroke 81, otherwise, the height of the frame is as a size of the stroke. A ratio of these sizes are used as an estimation of the line height of the line formed by the character string.

Performing re-sampling: Each stroke 81 is formed by a plurality of sampling points 83. If a distance of one sampling point 83 with a former sampling point 83 is smaller than a predetermined time of the estimation line height, the sampling point 83 is removed. If three continuous sampling points 83 are connected to be near a straight line, then a middle sampling point 83 of the three sampling points 83 is removed. As a result, the number of the sampling points 83 are reduced greatly.

Normalization of the coordinates: The coordinates of each sampling point 83 is divided by the estimated line height.

In training stage, all the strokes 81 of the tracks 80 are pre-processed by the stroke input processor 10 which are used as inputs of a neural network, and the character strings 90 corresponding to the tracks 80 are used as outputs of the neural network in training stage.

A string database 20 is connected to the stroke input processor 10 for storing a large amount of the tracks 80. In training stage, the string database 20 serves to store the tracks 80 and corresponding character strings 90 which are formed as string samples 100. Each stroke 81 is expressed by a plurality of sampling points 83.

In that, a first sampling point 83 of each stroke 81 is expressed by a coordinate (0, 0), and each of the other sampling points 83 is expressed by a displace vector with respective to a former sampling point 83. A final sampling point 83 of each stroke 81 is ended with an end token.

For promoting recognition ability of the system, the number of the string samples is increased by data expansion ways, wherein in the present invention, a string sample generator unit 30 is included, which is connected to a corpus and handwriting sample database 35 and the stroke input processor 10. The corpus and handwriting sample database 35 stores various characters, words, and samples of strokes 81 with respect to specific languages. The string sample generator unit 30 selects a large amount of character strings 90 and the corresponding strokes 81 from the corpus and handwriting sample database 35, and generates corresponding handwriting tracks 80 of character strings 90 so as to form a large amount of string samples 100 which are processed by the stroke input processor 10 and then are stored in the string database 20 for utilization in training of neural networks.

There are several ways for generating the handwriting tracks 80 by the string sample generator unit 30, including ways of:

(1) By text typesetting method renders the character strings 90 and records positions of each character string/word of the character string 90; then finding strokes 81 of the character string/word from the corpus and handwriting sample database 35 for acquiring the normalized stroke sequence and estimation of line height which are then inputted to the stroke input processor 10 for re-sampling and normalization of the coordinate so as to acquire corresponding string sample 100.

Furthermore, the characters, words, lines, etc. in the character string 90 can be classified and then the strokes 81 of the characters, words, lines of the same classification are performed with affine transformation so as to have a great variety of different tracks 80 and thus more string samples 100 are acquired for utilization in training of neural network.

(2) For lines form by texts with character strings 90 therein being tokenized, a translation model for one character string to a corresponding handwriting tracks is trained so as to generate corresponding string samples 100.

The string sample generator unit 30 stores the string samples 100 to the string database 20.

A word recognition neural network 40 includes an encoder 40, a decoder 42, an input interface 43 in the encoder 41, and an output interface 44 in the decoder 42. The input interface 43 is connected to the string database 20 for receiving the strokes 81 in the character string handwriting track 80. The encoder 41 serves to find a context matrix from the strokes 81 and an initial state used by the decoder 42. The decoder 42 receives the context matrix and the initial states. Furthermore the output interface 44 serves to output parts of the predicted character strings and confidences of these parts, in that, in the output of the decoder 43, the predicted character string is outputted part by part, that is to say, in each operation of the decoder 43, only a part of the predicted character string and it confidence are outputted, and then this part and the confidence are transferred back to the input of the decoder 43 to generate a further part of the character string and confidence thereof. This further part includes the former part of the character string inputted to the decoders. These processes are performed again until a set condition is achieve, the condition may be times of operation, or a set confidence is achieved.

The process is performed again and again, and a plurality of generated character strings 90 and corresponding confidences are acquired and stored in an output candidate unit 70 which are outputted from the output interface 44.

Figure 2:
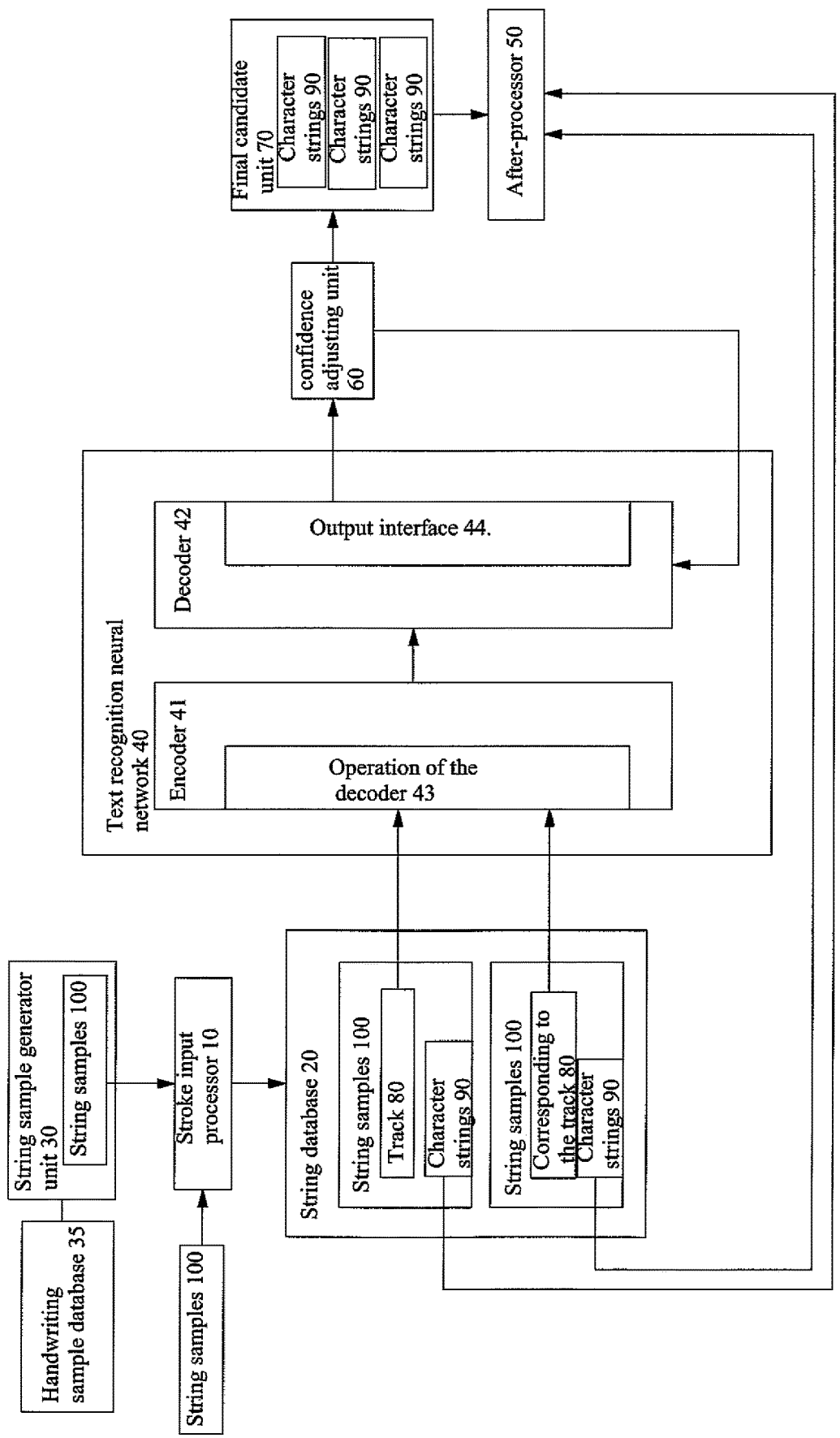
FIG. 2 is a schematic view showing the application in training stage of the present invention.
Figure 3:
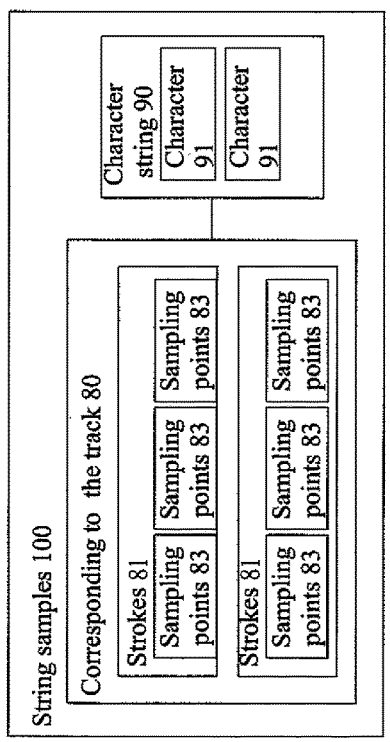
FIG. 3 is a block diagram showing the sample of the character strings according to the present invention.

Referring to FIG. 2, in the training stage, each stroke 81 of the track 80 is inputted to the text recognition neural network 40 from the input interface 43, and the character strings 90 corresponding to the track 80 are used as predicted output of the text recognition neural network 40.

An after-processor 50 is connected to the string database 20 and the output interface 44 of the text recognition neural network 40. The character strings 90 in the candidate unit 70 are normalized in the after processor 50 to be utilized as outputs of the text recognition neural network 40. The way of the normalization includes the following steps.

(1) A NFKD (Normalization Form KD) of Unicode is executed, mainly, same character expressing by various different forms are normalized as the same program codes.

(2) Order of stings expressed by Unicode are changed into visual order (from left to right) from logic order so as to cause all the texts in the strings have the same order (such as from left to right). In predicted state, it can predict that the predict result is also normalized. Therefore, recognized character string 90 should be executed with NKFC normalization of Unicode and the order of the codes of Unicode should be converted back to logic order from visual order.

For example, if at least one characters in one character string is arranged with an order which is not identical to an order of the whole character string, then at least one characters is re-arranged to make its order is identical to the order of the whole character string so that in training stage, the neural network is easy to recognize the whole character string.

In the present invention, the encoder 41 includes a multiple layered two directional LSTM (long short-term memory) circulation neural network (CNN) and a full connected neural network (FNN). The strokes 81 inputted to the encoder 41 is to be inputted to the multiple layered two directional LSTM CNN. The output of the CNN is a context matrix (which is a matrix related to the texts), The context matrix is performed with global average pooling and then is inputted to the FNN. The output of the FNN is an initial stage which is inputted to the decoder 42.

Inputs of the decoder 42 includes an input character, an decoding state, a converge vector, and the context matrix. The decoder 42 performs a recursive operation. In first stage, the initial data for the input character is a default one, the initial value of the converge vector is a zero vector, the initial value of the decoding state is the initial stage output from the encoder 41, and the context matrix is outputted from the encoder 41. Outputs of the decoder 42 is a new character (in the character string, this new character is next to the character input to the decoder) and the confidence thereof, a new decoding state, and a new converge vector. The new character is utilized as a new input character input to the decoder. The new character, new decoding state and new converge vector are recursive to the input of the decoder 42 so as to decode again. The decoding operation is performed again until a set condition is achieved, the set condition being set according to, for example, confidence, operation times, or number of the characters, etc. In the present invention, the dimension of the converge vector is related to the number of the sampling points 83 for recording which of the sampling pointed have corresponding output characters. Initial value for each dimension in the converge vector is set to zero. For characters have been found, then the values in the converge vector corresponding to that character is set to 1. Therefore, by the converge matrix, all the sampling points 83 can be found and no more character generates in recognition of the neural network.

A loss function can be defined in the decoder 42, which is linear combination of a plurality of functions defined in above. In operation, meaningful loss function must be defined for calibration of the cross-entropy of the confidential distribution and to adjust the covalence of the converge vector so that at the end of the operation, the value of the components of the converge vector is 1. When the stroke 81 of one character decoded, the loss function serves to cause the value of the component of the converge vector corresponding to the stroke 81 is 1. Therefore, in prediction stage, by variation of the values of the converge vector, the stroke input processor 10 corresponding to the output character can be determined.

In the prediction stage, the decoder 42 utilizes beam search to built candidate lines one by one. Each candidate line includes the character string, the confidence, the decoding state, the converge vector, and a predictive analysis stack which are recorded. The predictive analysis stack is a stack containing a series of grammar symbols in the predictive analysis method. The grammar symbols are related to grammar structure of the character string to be predicted. When some candidate characters for a next character in the character string 90 is desired to be provided, confidences corresponding to each candidate characters are also generated. When it is needed to output relations between a stroke 81 and a related character in the character string 90, a history of converge vector is also generated and recorded. After recursive operation, the decoder 42 performs the following operations to the non-complete candidate character string 90:

(1) Operating the decoder 42 for acquiring candidate characters for a next character in the character string 90 and a corresponding confidence for each candidate character and updating decoding state and converge vector.

(2). When candidate characters for a next character of a character string 90 outputted from the output interface 44 are further outputted to a confidence adjusting unit 60 installed between the output interface 44 and an after-processor 50. An n-gram calculation is used to get the probability of each character in the character string 90 so as to adjust the confidence of a next character to be generated by the decoder.

(3) For each candidate character for the next character, confidence of the combination of the candidate character with the current generated character string 90 and the predictive analysis stack are calculated.

(a) If the candidate character is an end symbol and the prediction analysis stack is null (no component therein), it is considered that the current character string 90 is a complete character string.

(b) if the candidate character is not an end symbol and the prediction analysis stack is not fault, then it is considered that the current character string 90 is not complete. Then this current generated character string 90 is used in the next process, that is, feeding back to the decoder 42 for further operation.

At a beginning of a next decoding operation, the decoder 42 only retains several candidate lines (which are a part of character string 90) with higher confidences. When the candidate lines output from the decoder 42 has achieved a set number, the decoder 42 stops. At this time, the candidate lines are possible character strings 90. The character strings 90 and the confidences thereof are stored to the final candidate 70, which are then outputted by the output interface 44.

Figure 4:
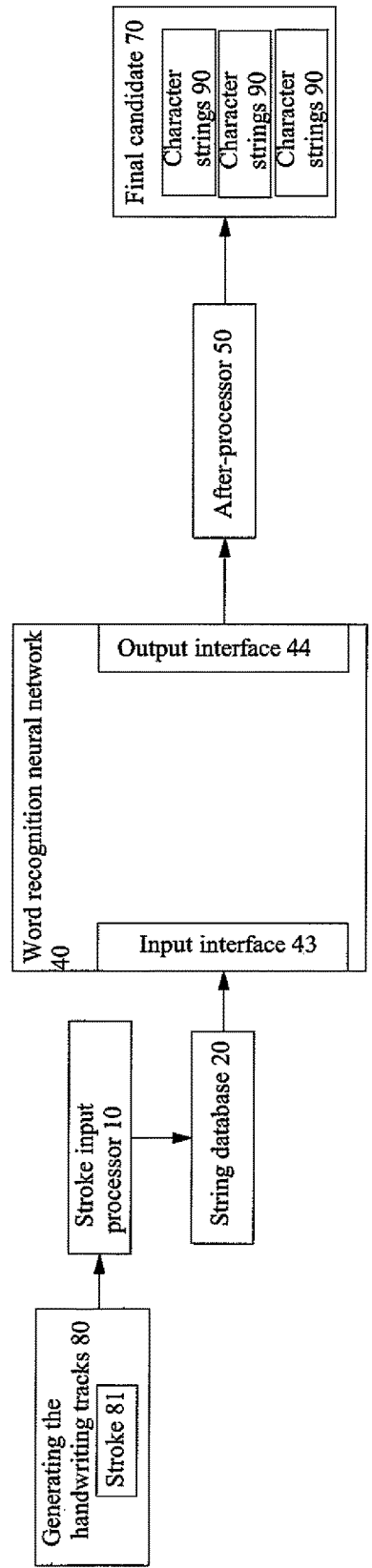
FIG. 4 is a schematic view showing the application in the prediction stage.

Referring to FIG. 4, in prediction state, the strokes 81 of a character string handwriting track 80 to be recognized are processed by the stroke input processor 10. Then the processed data is input to the text recognition neural network 40 from the string database 20 for recognition. The recognition result is processed by the after processor 50 and then the results are stored to the final candidate unit 70, which contains possible character strings 90 of the character string handwriting track 80 and the confidences thereof.

Advantages of the present invention are that the present invention provides higher rates of confidences. Some natural languages frequently all over the world can be recognized with a higher accuracy (including languages written from right to left and from left to right). The association relations between the input strokes and the character strings can be provided in the present invention. the present invention could support any strokes with irregular written orders. In real use, the present invention can be equipped with text recognition range for supporting open or closed corpus application. The present invention could be also used in the hand writing text recognition of mobile phones or tablet computers.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A handwriting text recognition system based on neural network, comprising: a stroke input processor for receiving tracks of online handwriting texts, where the handwriting texts exist corresponding to character strings; the tracks being divided into several strokes; in a training stage and a prediction stage of a neural network, the stroke input processor pre-processing the strokes; in training stage, these strokes being corresponding to a character strings which is a known character string; each character string being formed by at least one character; a handwriting track and corresponding character string being formed as a character string sample; a string database connected to the stroke input processor for storing a large amount of the tracks; in training stage, the string database serving for storing the tracks and corresponding character strings which are formed as character string samples; a word recognition neural network including an encoder, a decoder, an input interface in the encoder, and an output interface in the decoder; the input interface being connected to the string database for receiving the strokes of the tracks; the encoder serving for finding a context matrix from the strokes and an initial state used by the decoder; the decoder receiving the context matrix and the initial state; furthermore the output interface serving for outputting parts of the predicted character strings and confidences of these parts, in that, in the output of the decoder, the predicted character strings being outputted part by part, that is to say, in each operation of the decoder, only a part of the predicted character strings and its confidence are outputted, and then this part and the confidence are transferred back to the input of the decoder to generate a further part of the predicted character strings and confidence thereof; this further part includes the former part of the predicted character strings inputted to the decoder; these processes are performed again until a set condition is achieved; wherein in the training stage, each stroke of the track is inputted to the word recognition neural network from the input interface, and the character strings corresponding to the track are used as predicted output of the word recognition neural network; and an after-processor being connected to the string database and the output interface of the text recognition neural network; the character strings in the candidate unit are normalized in the after processor to be utilized as outputs of the word recognition neural network.

2. The handwriting text recognition system based on neural network as claimed in claim 1, wherein: the pre-processing of the stroke input processor includes the following ways of:

determining an outer rectangular frame of each stroke which is a minimum rectangular frame for containing the stroke; base of the left side of the outer rectangular frame of each stroke, a sequence for the outer rectangular frames of all strokes being determined according to the left side of the outer rectangular frames of the strokes;

when a length of a stroke being approximately equally to a width of the outer rectangular frame containing the stroke, the width of the outer rectangular frame being used as a size of the stroke, otherwise, the height of the outer rectangular frame being as a size of the stroke; a set ratio of these sizes being used as an estimation of the line height of the line formed by the character string;

each stroke being formed by a plurality of sampling points; if a distance of one sampling point with a former sampling point being smaller than a predetermined time of the estimation line height, the sampling point being removed; if three continuous sampling points being connected to be a straight line, then a middle sampling point of the three sampling points being removed; as a result, the number of the sampling points are reduced greatly; and normalization of coordinates of each sampling point; the coordinates of each sampling point being divided by the estimated line height.

3. The handwriting text recognition system based on neural network as claimed in claim 1, further comprising: a string sample generator unit, which is connected to a corpus and handwriting sample database and the stroke input processor; the corpus and handwriting sample database stores various characters, words, and samples of strokes with respect to specific languages; the string sample generator unit selects a large amount of character strings and the corresponding strokes from the corpus and handwriting sample database; and generates corresponding handwriting tracks of character strings so as to form a large amount of string samples which are processed by the stroke input processor and then are stored in the string database for utilization in training of neural networks.

4. The handwriting text recognition system based on neural network as claimed in claim 3, wherein the way for generating the handwriting tracks by the string sample generator unit, included ways that:

for lines form by texts with character strings therein being tokenized, a translation model for one character string to a corresponding handwriting tracks is trained so as to generate corresponding string samples; and the string sample generator unit stores the string samples to the string database.

5. The handwriting text recognition system based on neural network as claimed in claim 1, wherein the way for generating the handwriting tracks by the string sample generator unit, included ways that:

by text typesetting method renders the character strings and records positions of each character string/word of the character string; then finding strokes of the character string/word from the corpus and handwriting sample database for acquiring the normalized stroke sequence and estimation of line height which are then inputted to the stroke input processor for re-sampling and normalization of the coordinate so as to acquire corresponding string sample;

wherein the characters, words, lines, etc. in the character string are classified and then the strokes of the characters, words, lines of the same classification are performed with affine transformation so as to have a great variety of different tracks and thus more string samples are acquired for utilization in training of neural network.

6. The handwriting text recognition system based on neural network as claimed in claim 1, wherein the after processor performs a NFKD (Normalization Form KD) of Unicode, mainly, same character expressing by various different forms being normalized as same program codes.

7. The handwriting text recognition system based on neural network as claimed in claim 1, wherein the after processor performs operations that: order of stings expressed by Unicode are changed into visual order from logic order so as to cause all the texts in the strings have the same order; in predicted state, the predict result is normalized; a recognized character string is executed with NKFC normalization of Unicode and the order of the codes of Unicode is converted back to logic order from visual order.

8. The handwriting text recognition system based on neural network as claimed in claim 1, wherein the encoder includes a multiple layered two directional LSTM (long short-term memory) circulation neural network (CNN) and a full connected neural network (FNN); the strokes inputted to the encoder is to be inputted to the multiple layered two directional LSTM CNN; the output of the CNN is a context matrix, the context matrix is performed with global average pooling and then is inputted to the FNN; output of the FNN is an initial state inputted to the decoder.

9. The handwriting text recognition system based on neural network as claimed in claim 8, wherein each stroke is expressed by a plurality of sampling points, in that, a first sampling point of each stroke is expressed by a coordinate (0, 0), and each of the other sampling points is expressed by a displace vector with respective to a former sampling point; a final sampling point of each stroke is ended with an end token;

inputs of the decoder includes an input character, an decoding state, a converge vector, and the context matrix; the decoder performs a recursive operation, in first stage, the initial data for the input character is a default one, the initial value of the converge vector is a zero vector, the initial value of the decoding state is the initial stage output from the encoder, and the context matrix is outputted from the encoder; outputs of the decoder is a new character and the confidence thereof, a new decoding state, and a new converge vector, in the character string, this new character is next to the character input to the decoder; the new character is utilized as a new input character input to the decoder; the new character, new decoding state and new converge vector are recursive to the input of the decoder so as to decode again; the decoding operation is performed again until a set condition is achieved; the dimension of the converge vector is related to the number of the sampling points for recording which of the sampling pointed have corresponding output characters; initial value for each dimension in the converge vector is set to zero; for characters have been found, then the values in the converge vector corresponding to that character is set to 1; and therefore, by the converge matrix, all the sampling points are found and no more character generates in recognition of the neural network.

10. The handwriting text recognition system based on neural network as claimed in claim 9, wherein a loss function is defined in the decoder for calibration of the cross-entropy of a confidential distribution and to adjust the covalence of the converge vector so that at the end of the operation, the value of the components of the converge vector is 1; when the stroke of one character decoded, the loss function serves to cause the value of the component of the converge vector corresponding to the stroke is 1; therefore, in prediction stage, by variation of the values of the converge vector, the stroke input processor corresponding to the output character is determined.

11. The handwriting text recognition system based on neural network as claimed in claim 9, wherein in the prediction stage, the decoder utilizes beam search to build candidate lines one by one; each candidate line includes the character string, the confidence, the decoding state, the converge vector, and a predictive analysis stack which are recorded; the predictive analysis stack is a stack containing a series of grammar symbols in the predictive analysis method; the grammar symbols are related to grammar structure of the character string to be predicted; and when some candidate characters for a next character in the character string is necessary to be provided, confidences corresponding to each candidate characters are also generated; when it is needed to output relations between a stroke and a related character in the character string, a history of converge vector is also generated and recorded.

12. The handwriting text recognition system based on neural network as claimed in claim 11, wherein after recursive operation, the decoder performs the following operations to the non-complete candidate character string:

(1) operating the decoder for acquiring candidate characters for a next character in the character string and a corresponding confidence for each candidate character and updating decoding state and converge vector;

(2). when candidate characters for a next character of a character string outputted from the output interface are further outputted to a confidence adjusting unit installed between the output interface and an afterprocessor; an n-gram calculation is used to get the probability of each character in the character string so as to adjust the confidence of a next character to be generated by the decoder;

(3) for each candidate character for the next character, confidence of the combination of the candidate character with the current generated character string and the predictive analysis stack are calculated;

(a) If the candidate character is an end symbol and the prediction analysis stack is null (no component therein), it is considered that the current character string is a complete character string; and (b) if the candidate character is not an end symbol and the prediction analysis stack is not fault, then it is considered that the current character string is not complete; then this current generated character string is used in the next process, that is, feeding back to the decoder for further operation;

wherein at a beginning of a next decoding operation, the decoder only retains several candidate lines with higher confidences; when the candidate lines output from the decoder has achieved a set number, the decoder stops; at this time, the candidate lines are possible character strings; thee character strings and the confidences thereof are stored to a final candidate unit, which are then outputted by the output interface.

13. The handwriting text recognition system based on neural network as claimed in claim 12, wherein in prediction state, the strokes of a character string handwriting track to be recognized are processed by the stroke input processor; then the processed data is input to the word recognition neural network from the string database for recognition; the recognition result is processed by the after processor and then the results are stored to the final candidate unit, which contains possible character strings of the character string handwriting track and the confidences thereof.

\* \* \* \* \*